Oct. 23, 1962

G. A. BUON 3,060,405

FLIGHT INTEGRATOR

Filed Dec. 17, 1956

Oct. 23, 1962  G. A. BUON  3,060,405
FLIGHT INTEGRATOR

Filed Dec. 17, 1956  4 Sheets-Sheet 3

INVENTOR
GEORGES A. BUON

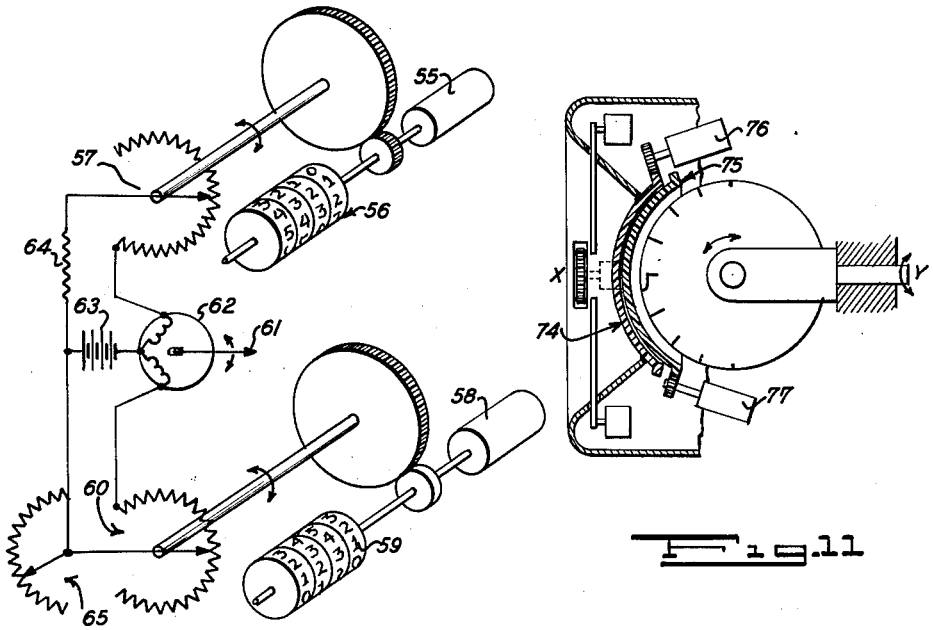
Fig. 9
Fig. 11
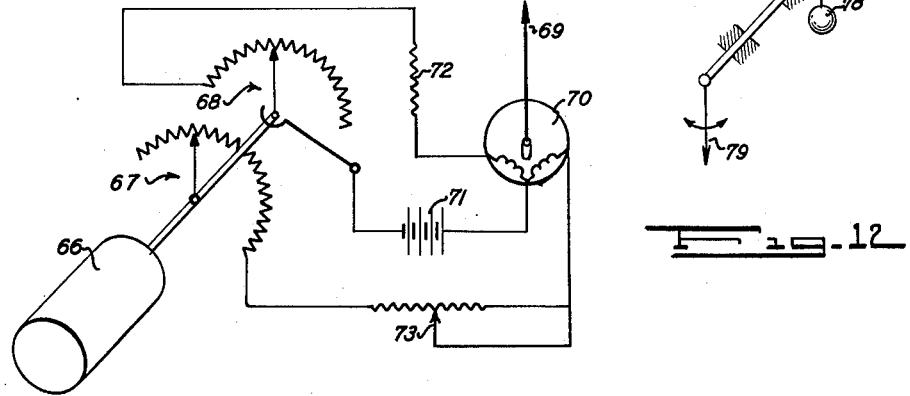
Fig. 10
Fig. 12
INVENTOR
GEORGES A. BUON

United States Patent Office 3,060,405
Patented Oct. 23, 1962

3,060,405
FLIGHT INTEGRATOR
Georges A. Buon, New York, N.Y.
(141—59 85th Road, Jamaica 35, N.Y.)
Filed Dec. 17, 1956, Ser. No. 628,626
1 Claim. (Cl. 340—26)

This invention relates to instruments for flight control and the like.

It is an object of the invetnion to provide means for facilitating the operation of aircraft and various other modes of transportation and the like.

According to the invention, there is contemplated an instrument which will present an integrated picture, in the form of four pointers arranged on a dial, of the most important flight data required for instrument flying. After proper orientation of these four pointers, a pilot must maintain his controls to align the pointers in a perfect cross. The perfect cross attitude of the pointers on the dial indicates correct flight conditions.

With an instrument of the invention, a pilot can fly according to the pointers as well as by flight command, and this can be done simultaneously. In addition, the instrument displays to the pilot various navigation data.

A further object of the invention is to permit simple reading of flight information, and to reduce to a bare minimum the mental and physical fatigue which has been associated with instrument flying.

Another object of this invention is to make it possible for a pilot to receive instructions either from a remote flight commander situated at some place other than in the plane itself or, if desired, in the plane with the pilot.

It will be noted in this specification that the terms "flight commander" and "flight director" are used interchangeably.

Another object of this invention is to produce an instrument that will prevent visual fatigue.

Other objects as well as advantages of the invention will be found in the following detailed description as illustrated in the accompanying drawing in which:

FIG. 1 is a front view of a dial provided in accordance with the invention;

FIGS. 1A, B, C and D respectively indicate instruments incorporated in function into the dial of FIG. 1;

Figure 1:
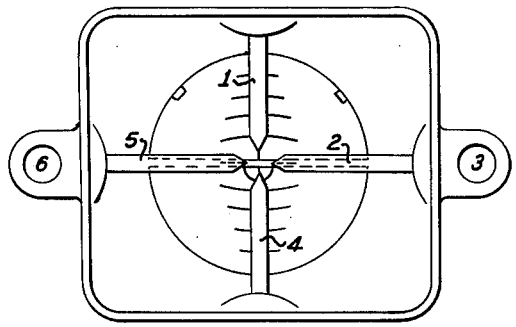
Figure 1D:
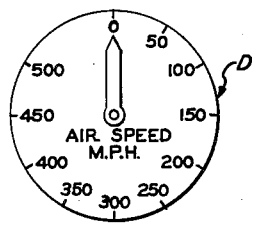
Figure 1A:
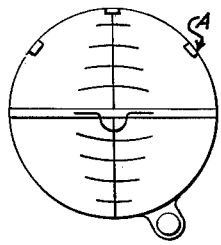
Figure 1B:
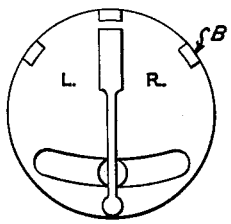
Figure 1C:
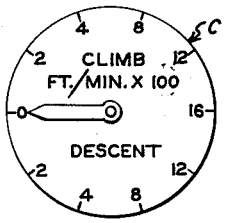

FIG. 7 diagrammatically illustrates a circuit for transmitting data to the instrument of FIG. 1;

FIG. 8 diagrammatically illustrates an associated receiver circuit;

FIG. 9 diagrammatically illustrates means employed in accordance with the invention for indicating flight data;

FIG. 10 illustrates a system for indicating rate of turn;

FIG. 11 is a side cross section of an instrument of the invention; and

FIG. 12 illustrates a slip indicator system.

FIG. 1 illustrates the dial arrangement in the form of a rectangle. In the center of symmetry, limited by a circle, appears the attitude gyro horizon A. On the two main axis of the rectangle, and projecting toward the center, are four pointers forming a cross. Each one of these pointers is related to a basic instrument of flight. The top pointer 1 is related to the bank dampened pendulum of the classic "turn and bank" instrument B. The pointer at the right 2 is related to the rate of climb or descent indicator C and can be adjusted by a trim knob 3. The bottom center pointer 4 is related also to the gyro of the "turn and bank" instrument B. The pointer 5 on the left is related to the air speed instrument D. It can also be adjusted by a trim knob 6.

Figure 2:
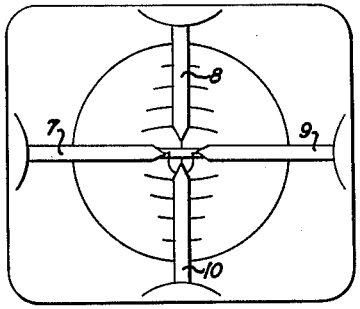
FIGS. 2, 3 and 4 illustrate the dial of FIG. 1 under different dynamic flight conditions, FIG. 2 showing the dial with the associated aircraft properly followin a flight plan.

FIG. 2 is an example of correct flight. The attitude gyro is in a horizontal position. At the center, the four pointers form a perfect cross, which means that:

(a) The aircraft is flying at the one desired forward speed, as indicated by pointer 7.

(b) Pointer 8 shows that the aircraft is not under any slip condition.

(c) Pointer 9 shows that the aircraft is flying perfectly level.

(d) Pointer 10 shows that the aircraft flies straight.

Therefore, FIG. 2 shows that the aircraft is flying in a straight and level path, at the correct forward speed and without any slip or crabbing motion.

Figure 3:
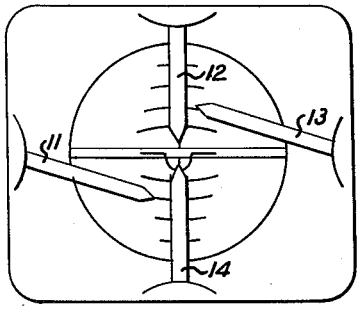

FIG. 3 is an example of correct straight climbing flight without the prior adjustment of knobs 3 and 6 (FIG. 1) which would be made in accordance with the invention. The attitude gyro is horizontal but shows a positive angle of the aircraft in its forward direction. The pointers 12 and 14 are in line with the center, but the left and right pointers are out of line to form a cross. All of this means that:

(a) The aircraft is flying at a lesser speed than cruising speed (in climb this is normal) as pointer 11 shows.

(b) The aircraft does not slip (very important in climb) as pointer 12 shows.

(c) The aircraft is climbing at a certain rate that pointer 13 shows.

(d) The aircraft is flying straight as pointer 14 shows.

Therefore, FIG. 3 shows a correct straight climbing path followed by the aircraft. However, with knobs 3 and 6 adjusted, a perfect cruciform would result in FIG. 3 for proper climbing conditions.

Figure 4:
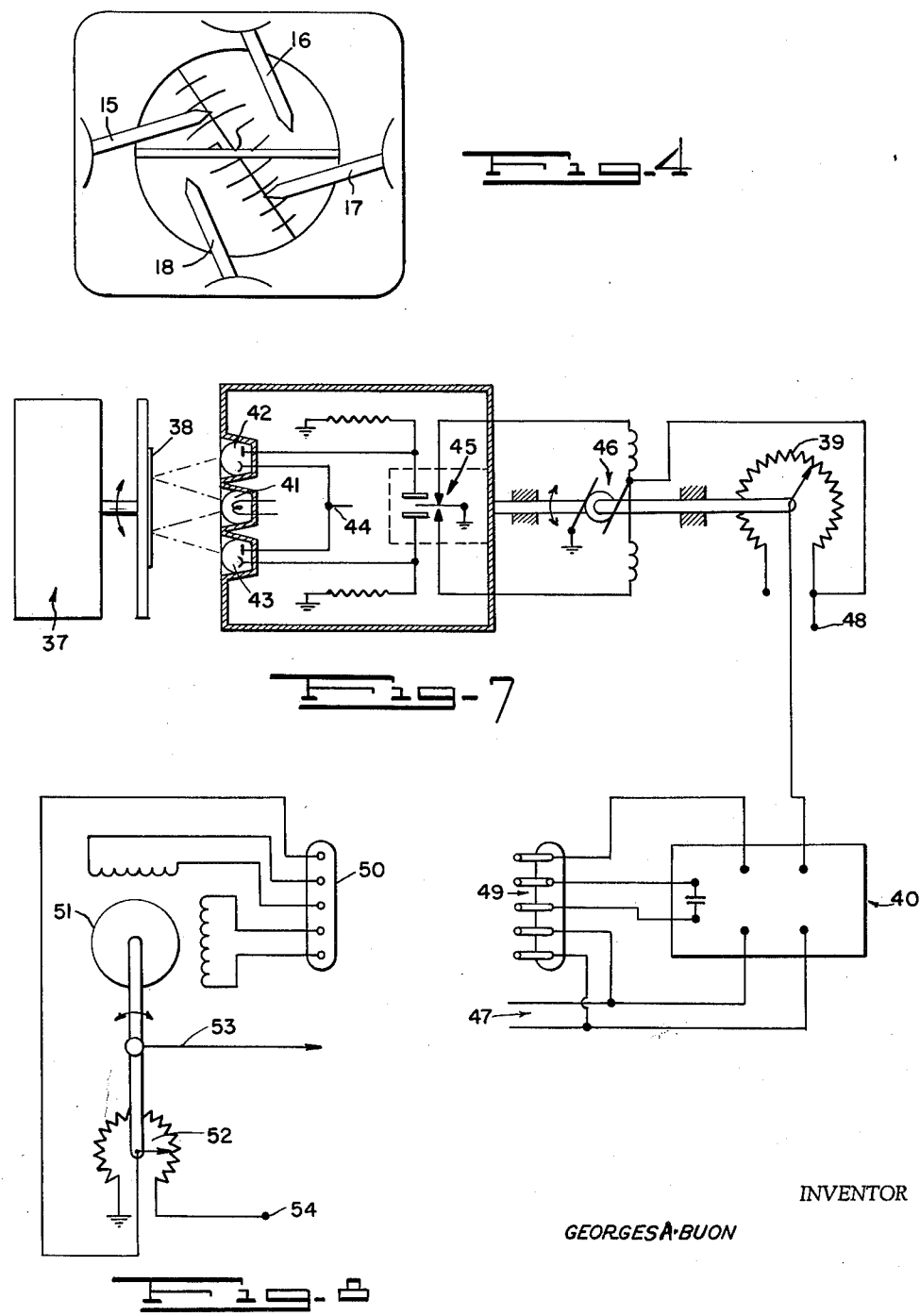

FIG. 4 shows clearly the errors of the pilot during a level left turn.

The attitude gyro is banked to the left, but under the line horizon, and the four pointers are out of the positions in which they should be. This means that:

(a) The aircraft is flying too fast in its forward direction, as pointer 15 shows.

(b) The aircraft slips toward the right, as pointer 16 shows.

(c) The aircraft is in descent, as pointer 17 shows.

(d) The aircraft is turning too much toward the left, which is shown by pointer 18.

Specifically, FIG. 4 shows a typical case of a dangerous diving spiral, which is to be corrected by returning to the center, the gyro attitude, and pointers 15, 16 and 17.

Many other typical cases can be shown. Only one has been described, as above, to provide for better understanding of the fact that the pilot of an aircraft in instrument flight does not need to keep constant watch of an entire instrument panel in order to evaluate flight conditions, and apply his proper reflexes to the controls with the flight integrator of the invention, the pilot merely corrects by conditioned reflex and effortlessly, as in visual flight, the pointers to the position he knows they should occupy.

Figure 5:
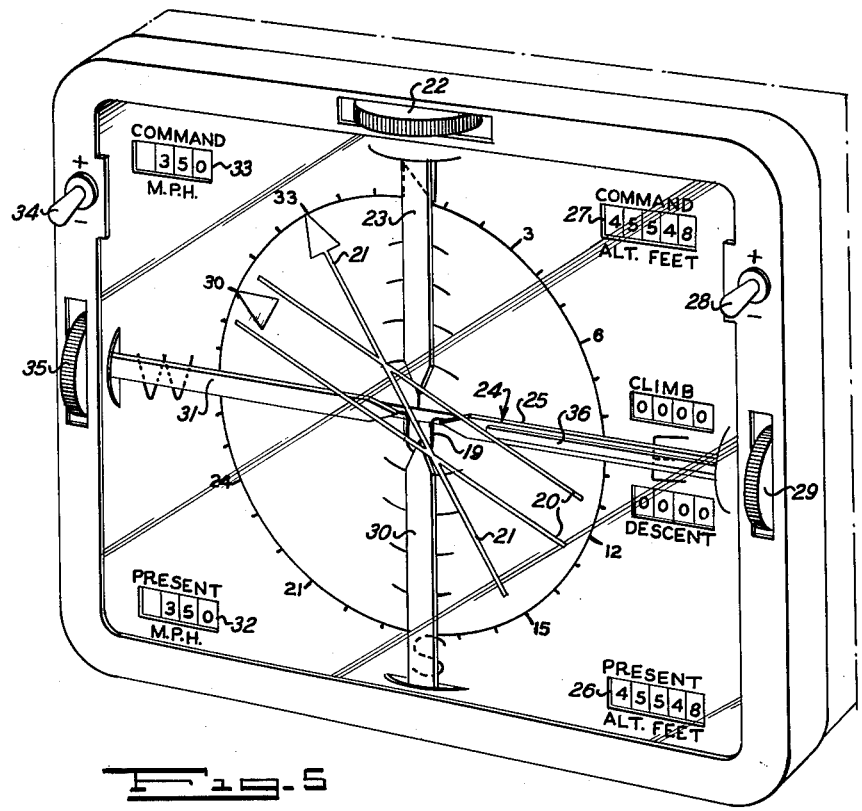
FIG. 5 illustrates, partly broken away, a further embodiment of the invention.

The complete flight integrator model shown in FIG. 5, gives the pilot additional information which, in general, eliminates the need for observation of any other instrument related to the flight conditions of an associated aircraft. In addition, this model permits the pilot to enter any flight characteristics he wishes to follow. Also it can show the pilot any flight characteristics proposed from remote sources outside the aircraft, as, for example, ground command. This adds tremendously to the usefulness of the invention particularly in modern military aircraft.

FIG. 5 shows that the dial is preferably rectangular. At the center of symmetry, limited by a circle, the attitude gyro horizon 19 appears in the background. On the circle in front, and by transparency, are the two pointers (20 and 21) of the course which is established by the remote flight director or entered by the pilot and of the course actually followed by the aircraft, respectively. A trimmer knob 22 allows the pilot to enter course data on or orient pointer 20 as needed. Placed on the axis of symmetry of the rectangle and projecting toward the center, in front of the course indicators, are four pointers forming a cruciform or cross. Each one of these pointers is related to a basic flight instrument. In the case of flying under remote flight director control, some of these pointers are related equally to the instruments and to an outside source, as will be explained hereinafter.

The top pointer 23 is only related to the bank dampened pendulum of the classic "turn and bank" indicator.

Figure 6:
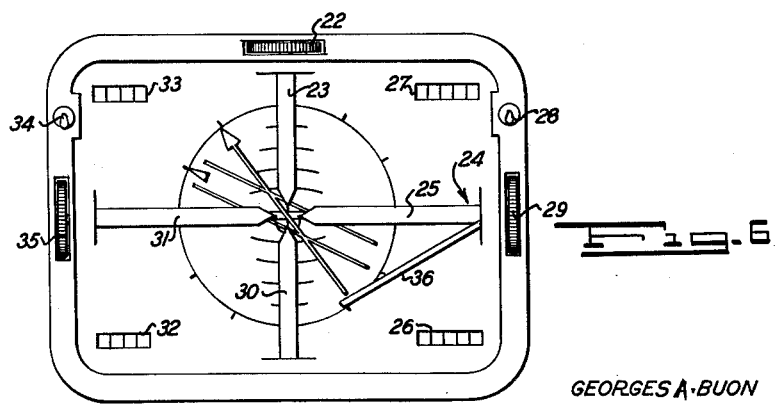
FIG. 6 is a front plan view of the structure of FIG. 5 with a different flight condition.

The pointer 24 can actually be two pointers forming an angle, the apex of which is at the edge of the rectangle (FIG. 6). One of these pointers is wider than the other. The wider one 25 will indicate the rate of climb or of descent of the aircraft, and the absolute value can be read on the two counters placed directly on either side of the pointer 24. The thinner pointer 36 shown on FIG. 6, is related to the present altitude of the aircraft given by the right lower counter 26 and to the altitude proposed by the remote flight director or entered by the pilot and given by the upper right counter 27. This pointer reacts according to the difference of the values read at 26 and 27. A toggle switch 28 permits the pilot to enter the altitude he wants when out of flight director control. The trimming knob 29 permits the pilot to orient the pointer of the rate of climb or descent 25 as needed.

The bottom center pointer 30 is related to the gyro of "turn and bank" and shows which side left or right and at which rate of turn the aircraft is turning.

The pointer 31 is related to the air speed of the aircraft, which value is shown at the left bottom counter 32 and also to the speed proposed by the flight director or entered by the pilot, which value is shown by the upper left counter 33. This pointer reacts according to the difference of the values read at 32 and 33. Knob 35 permits the pilot to orient the pointer 31 as needed.

A toggle switch 34 permits the pilot to enter speed value he wants when out of flight director control.

FIG. 7 shows the pickoff motion system, in schematic form, for remote transmission of the indications of instruments such as speed indicators and altimeters. Element 37 is an instrument equipped with a disc instead of a pointer. On this disc a sector 38 is painted in white. In front of the disc and coaxially disposed is a followup servo-mechanism the function of which is: (a) to follow the opposite disc by following the movement of the white sector and (b) to drive accordingly a potentiometer 39 which itself is part of the remote control system and feed the input of the magnetic amplifier 40, which is part of the system.

The followup mechanism functions in the following manner:

A lamp 41 lights the white sector 38 of the instrument. On each side of the lamp are inserted two photo-conductive cells 42 and 43 which receive only a slight portion of reflected light from the opposite white sector. The cells 42 and 43 are supplied, via terminal 44, with a voltage. When the two cells are at the same potential both sides of a capacitive single pole, double throw switch 45 are open and a reversible D.C. servo-motor 46 placed in the same circuit is not energized thus keeping the potentiometer 39 at rest. The slightest angular motion of the disc in any direction makes one cell more conductive and switch 45 will then energize the servo-motor 46 until equilibrium is attained. Thus potentiometer 39 will follow the motion of the disc of the instrument whereby it becomes possible to transmit every motion to a remote aircraft without any structural connection thereto. In FIG. 7, terminals 47 are for feeding alternating current to magnetic amplifier 40. Terminal 48 is for the positive side of the D.C. voltage used for energizing the motor 46 and potentiometer 39. Connector 49 will connect by electric cable to the mating part of receiver of the system.

FIG. 8 shows the receiver side of the remote transmission system for which FIG. 7 represents the transmitter portion. Element 50 is the receptacle from the transmitting cable. Servo-motor 51 will be energized in one direction or the other as long as the potentiometer 52, driven by it, does not have the same electrical characteristics as the transmitting potentiometer 39. Thus the pointer 53, or any indicating medium in relation to the shaft of potentiometer 52 will reproduce at distance, the data of instrument 37. Terminal 54 is a source of positive D.C. voltage of the same characteristics as fed to terminal 48 of the transmitter.

The use of remotely controlled pointers in the instrument shown in FIG. 5 is: (a) to reduce to a small size the general arrangement of the dial and its mounting on a panel instrument (b) at the same time to orient the pointers 24, 31, FIG. 5, and 36, FIG. 6 to provide for indicating the differential between two respective data, namely, the command data and the actual flight data of the aircraft. When there is no difference, the pointers constitute a cruciform.

FIG. 9 shows the manner in which the pointers 24, 31, FIG. 5, and 36, FIG. 6, can be actuated. Element 55 is a receiver servo-motor controlled by radio signal from the flight director or by the pilot. This servo-motor shows the data by means of a digital counter 56. It also drives the potentiometer 57. At the lower part of FIG. 9, another servo-motor 58 reproduces the data from the instrument giving the actual flight characteristics of the aircraft as explained above with reference to FIGS. 7 and 8. This latter data is given in absolute value by digital counter 59. Potentiometer 60 is driven by servo-motor 58. The pointer 61 is actuated by an electric differential movement 62 connected to potentiometers 57 and 60, the source of D.C. or battery 63, the fixed resistor 64 and adjustable resistor 65. Resistor 64 is to provide a protective load and adjustable resistor 65 is to balance resistor 64 and permit adjustment of pointer 61 to indicate correctly the relationship of information displayed by counters 56 and 59.

FIG. 10 shows a system for remotely orienting pointer 30 of FIG. 5, which represents the rate of turn of the aircraft in flight.

The dampened gimbal of gyro 66 actuates potentiometer 67 and 68 mounted on the same shaft. Pointer 69 is actuated by an electric differential movement 70 inserted in the circuit and connected with potentiometers 67 and 68, the source of the D.C. or battery 71, the fixed resistor 72 and the adjustable resistor 73. Resistors 72 and 73 provide the protective load. Adjusting resistor 73 is provided to balance resistor 72 and to permit adjustment of pointer 69 in such a way to indicate the correct information as sent by gyro 66 and its associated potentiometers 67 and 68.

FIG. 11 represents a simplified profile section of a portion of the flight integrator mounted on the panel instrument of an aircraft.

The purpose of FIG. 11 is to show the disposition of the pointers 20 and 21, FIG. 5. These pointers are laid on respective spherical transparent and rotatable supports 74 and 75. They rotate about axis X—Y of the instrument and are actuated respectively by servo-motors 76 and 77. One of them is controlled by radio signal from flight director and when out of flight director control, by a pilot adjustment effected with knob 22, FIG. 5.

The other is controlled by and reproduces the data sent by the compass of the aircraft.

FIG. 12 represents the slip indicator system in which a pendulum 78 transmits its motion to pointer 79 and is dampened by springs 80 and 81. Due to its simplicity, this instrument can be directly built in the part of the flight integrator mounted on the panel of the aircraft.

In the drawings has been shown a specific form of the apparatus of our invention, but it is understood that the invention is not limited to such form since it may be used in different forms without departing from the spirit of the invention as expressed in the following claim.

What is claimed is:

An aircraft instrument consisting of a single dial fixed on said aircraft and comprising a plurality of spaced pivot means on said dial and positioned symmetrically about a common center, four pointers on said pivot means for indicating respective dynamic flight conditions and adapted to point at said center to form thereby a cruciform, two of said pointers indicating turn and bank, the other of said pointers respectively indicating air speed and rate of change of altitude, and orientation means operatively associated with said pointers for orienting the same so that said cruciform results with the aircraft performing according to a predetermined dynamic flight plan, said orientation means comprising remote and manual controls for orienting said pointers, said remote control being positioned other than in the aircraft, and switch means coupled to said control for selecting one of the latter, one of said pointers comprising two independently pivotal sections supported on one of said pivot means and respectively indicating rate of climb and altitude.

References Cited in the file of this patent

UNITED STATES PATENTS

| | | |
|---|---|---|
| 1,836,881 | Sperry | Dec. 15, 1931 |
| 2,262,033 | Moseley | Nov. 11, 1941 |
| 2,328,730 | Lorenzen | Sept. 7, 1943 |
| 2,342,220 | Price | Feb. 22, 1944 |
| 2,538,843 | McGuire | Jan. 23, 1951 |
| 2,613,352 | Kellogg | Oct. 7, 1952 |
| 2,660,977 | Gordon | Dec. 1, 1953 |
| 2,685,226 | Crane | Aug. 3, 1954 |
| 2,782,395 | Hammond | Feb. 19, 1957 |

FOREIGN PATENTS

| | | |
|---|---|---|
| 156,477 | Australia | May 14, 1954 |
| 748,689 | Great Britain | May 9, 1956 |